United States Patent
Gregerson et al.

(10) Patent No.: US 6,702,183 B2
(45) Date of Patent: Mar. 9, 2004

(54) METHODS AND APPARATUS FOR SCAN PATTERN SELECTION AND SELECTIVE DECODE INHIBITION IN BARCODE SCANNERS

(75) Inventors: David Lee Gregerson, Duluth, GA (US); Frank Stanley Hannah, Suwanee, GA (US); William Martin Belknap, Lawrenceville, GA (US); James Brian McCord, Simpsonville, SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/836,837

(22) Filed: Apr. 17, 2001

(65) Prior Publication Data

US 2002/0148898 A1 Oct. 17, 2002

(51) Int. Cl.[7] .................................................. G06K 7/10
(52) U.S. Cl. ............................. 235/462.15; 235/462.01
(58) Field of Search ................................ 235/462, 472, 235/454, 470

(56) References Cited

U.S. PATENT DOCUMENTS

| | | | | |
|---|---|---|---|---|
| 4,154,131 A | * | 5/1979 | Studer et al. ................. 84/1.03 |
| 4,521,678 A | | 6/1985 | Winter ......................... 235/472 |
| 5,059,778 A | * | 10/1991 | Zouzoulas et al. .......... 235/472 |
| 5,107,304 A | * | 4/1992 | Haneda et al. .............. 355/296 |
| 5,151,581 A | | 9/1992 | Krichever et al. .......... 235/467 |
| 5,241,164 A | | 8/1993 | Pavlidis et al. ............. 235/462 |
| 5,278,398 A | | 1/1994 | Pavlidis et al. ............. 235/462 |
| 5,504,316 A | * | 4/1996 | Bridgelall .................... 235/462 |
| 5,528,022 A | * | 6/1996 | Nakazawa ................... 235/436 |
| 5,600,121 A | | 2/1997 | Kahn et al. .................. 235/472 |
| 5,691,528 A | | 11/1997 | Wyatt et al. ................. 235/462 |
| 5,780,831 A | | 7/1998 | Seo et al. .................... 235/462 |
| 5,811,785 A | * | 9/1998 | Heiman et al. ............. 235/472 |
| 5,962,836 A | | 10/1999 | Tani et al. ................... 235/454 |
| 5,992,746 A | | 11/1999 | Suzuki .................. 235/462.21 |
| 5,992,753 A | | 11/1999 | Xu ......................... 235/472.01 |
| 6,010,071 A | | 1/2000 | Bard et al. ............. 235/462.43 |
| 6,053,413 A | | 4/2000 | Swift et al. ............ 235/472.01 |
| 6,164,546 A | * | 12/2000 | Kumagai et al. ...... 235/472.01 |
| 6,216,953 B1 | * | 4/2001 | Kumagai et al. ...... 235/472.01 |
| 6,283,375 B1 | * | 9/2001 | Wilz, Sr. et al. ....... 235/462.45 |

* cited by examiner

*Primary Examiner*—Thien M. Le
(74) *Attorney, Agent, or Firm*—Priest & Goldstein, PLLC

(57) ABSTRACT

Methods and apparatus for switching between scan patterns produced by a barcode scanner and for switching between allowing and inhibiting decoding of barcodes are disclosed. Depending on the position of a multiposition switch controlled by an operator, the scanner produces an omnidirectional scan pattern and immediately decodes barcodes falling within the field of view of the scanner, produces a single line scan pattern but inhibits decoding of barcodes until the switch is moved to a position to select allowing decoding of barcodes, or produces a single line scan pattern and immediately decodes barcodes falling within the field of view of the scanner. If the scanner has been set to decode barcodes using a single line scan pattern, a delay is imposed between the time the switch is set to select producing an omnidirectional scan pattern and the time at which the scanner begins to produce the omnidirectional scan pattern.

14 Claims, 2 Drawing Sheets

METHODS AND APPARATUS FOR SCAN PATTERN SELECTION AND SELECTIVE DECODE INHIBITION IN BARCODE SCANNERS

FIELD OF THE INVENTION

The present invention relates generally to improved techniques for capturing of barcode information. More particularly, the invention relates to methods and apparatus for use of a user selection device such as a multiposition switch to select among possible scan patterns and to selectively inhibit decoding in a multimode scanner.

BACKGROUND OF THE INVENTION

A barcode signal is typically produced by passing or scanning a laser beam across a barcode. The laser beam traces a pattern into which the barcode is introduced, and the light reflected from the barcode as the scanner traces across the barcode is captured to produce a photosignal which is decoded to extract barcode information. Depending on the expected use of a barcode scanner and the nature of the barcodes likely to be presented to the scanner, different patterns may be selected for use. A scanner may be designed to employ a particular pattern, or may be designed to allow selection from a variety of patterns. The most common patterns employed are an omnidirectional pattern and a single line pattern. An omnidirectional pattern is most convenient for use when a single barcode is to be brought within the field of view of the scanner and involves the tracing of a two dimensional pattern by the laser. When a barcode is brought within this pattern, recognition and decoding occur quickly. It is not necessary to position the barcode precisely in order to enable the scanner to recognize the barcode. However, an omnidirectional pattern is not suitable for decoding one of a group of barcodes occurring in close proximity to one another, because it is not possible to isolate the pattern to the area of a single barcode.

A single line pattern involves the tracing of the laser back and forth in one dimension, so that the pattern appears as a straight line. A straight line pattern can be more easily aligned to a defined area than can an omnidirectional pattern, so that it is possible to decode a barcode occurring in proximity to other barcodes.

Barcode scanners of the prior art suffer from a significant limitation when presented with a need to decode a barcode occurring in close proximity to other barcodes. Scanners are typically active to capture and decode a barcode as soon as the barcode comes within a scanner pattern. Even in the case of a single line pattern, the correct barcode must be aligned with the pattern in order to be scanned. In the case of a single line pattern, the operator typically needs to see the pattern in order to align it with a barcode. If other barcodes occur near the desired barcode, the scanner pattern may fall on one of the other barcodes before the operator is able to align it with the desired barcode. This can result in detection and decoding of one of the other, undesired barcodes resulting in a need for the operator to delete the false reading or, if the operator fails to notice that a false reading was made, an error resulting from the false reading.

There exists, therefore, a need in the art for a barcode scanner which will allow an operator to align a scan pattern with a desired barcode and which will allow decoding to be inhibited until alignment is achieved.

SUMMARY OF THE INVENTION

A barcode scanner according to one aspect of the present invention includes a scanner engine which produces either a presentation scan or a single line scan according to an operator selection. The scanner also includes a photodiode for converting reflected light into a photosignal and a decoding circuit for decoding the photosignal to extract barcode information. The decoding circuit communicates with a processor which directs the operation of the scanner engine and the decoding of the barcode signal and use of the barcode information. The scanner also includes a user selection device connected to the processor for providing operator selection information to the processor. As an example, the user selection device may be implemented as a pushbutton with a first position which may be characterized as a released position, a second position which may be characterized as a first pressed position at a stop in an intermediate position in the range of travel of the pushbutton, and a third position which may be characterized as a second pressed position at the end of the range of travel of the pushbutton. If the pushbutton is in a released position, the scanner engine produces an omnidirectional scan. If the pushbutton is in a first pressed position, the scanner produces a single line scan and the processor inhibits decode of a barcode. If the pushbutton is in a second pressed position, the scanner produces a single line scan and the processor decodes a barcode aligned with the scan pattern. In this way the pushbutton may be moved to the first pressed position to allow the scanner to produce a scan pattern which can be aligned with a desired barcode, but without a danger of decoding a barcode for which decoding is not desired while alignment is taking place. Once a satisfactory alignment has been made, the pushbutton can be moved to the second pressed position to allow decoding.

A more complete understanding of the present invention, as well as further features and advantages of the invention, will be apparent from the following Detailed Description and the accompanying drawings.

DETAILED DESCRIPTION

Figure 1:
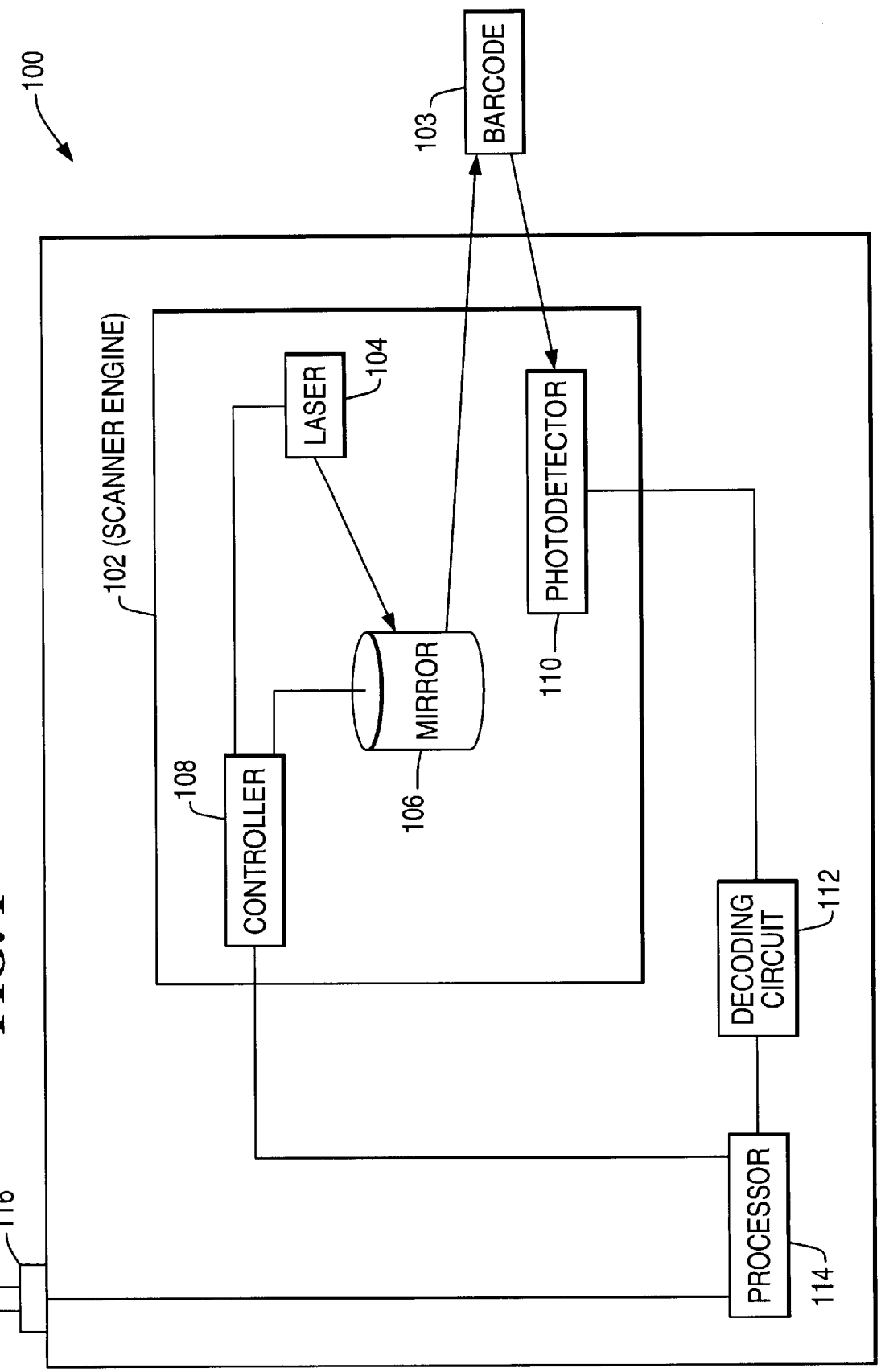
FIG. 1 illustrates a barcode scanner according to the present invention.

FIG. 1 illustrates a scanner 100 according to the present invention. The scanner 100 may suitably be an omnidirectional presentation scanner, but other implementations, including but not limited to handheld scanners may also be used. The scanner 100 includes a scanner engine 102 for generating a scan pattern onto a barcode 103 and receiving reflected light back from the barcode 103 to create a photosignal. The scanner engine 102 preferably comprises a laser 104, a rotating mirror 106 for reflecting light produced by the laser 104 to form a desired pattern, a controller 108 for controlling the laser 104 and mirror 106 and a photodetector 110 to produce the photosignal. The scanner 102 also includes a decoding circuit 112 for receiving the photosignal and decoding the photosignal to extract barcode information. The scanner engine 102 and the decoding circuit 112 are controlled by a processor 114. The processor 114 communicates with the controller 108 to direct the scanner engine 102 to produce a desired scan pattern. The processor 114 also controls processing of the photosignal by the decoding circuit 112 and receives the barcode information extracted by the decoding circuit 112. The scanner 100 also includes a user selection device for receiving user input and producing user selection information for use in selecting an operational state of the scanner 100, implemented here as a multiposition switch such as a pushbutton 116 connected to the processor 114 and used by a scanner operator to control the operation of the scanner 100. In the exemplary implementation shown here, the pushbutton 116 may suitably have three positions for choosing among three different operational states of the scanner 100. Depending on the position of the pushbutton 116, the processor 114 selects the scan pattern to be produced by the scanner engine 102 and selects the decoding operation to be performed by the decoding circuit 112. When the processor 114 detects that the pushbutton 116 is in a first or released position, the processor 114 sets the scanner 100 to a default state, directing the scanner engine 102 to produce an omnidirectional pattern suitable for reading a single isolated barcode. In the default state, the processor 114 also directs the decoding circuit 112 to extract barcode operation immediately upon receiving a photosignal representing a barcode. Upon receiving the extracted barcode information, the processor 114 registers the barcode information and enters it into whatever transaction is being conducted, such as a checkout transaction, an inventory transaction or the like.

When the processor 114 detects that the pushbutton 116 is in a second position, which may also be referred to as a first pressed position, the processor 114 directs the scanner engine 102 to produce a single line scan. The processor 114 also directs the decoding circuit 110 to inhibit barcode decode.

Use of the scanner 100 with the pushbutton 116 in the released position is suitable for processing of a barcode when no other barcodes are within or near the field of view of the scanner 100 because there is little likelihood of processing an undesired barcode. Use of the scanner 100 with the pushbutton 116 in the first pressed position allows alignment of the single line scan with a barcode which is in relatively close proximity to other barcodes which may fall within the field of view of the scanner 100. Use of the single line scan insures that only the barcode aligned with the single line scan pattern will be processed, and inhibiting scanning gives the operator the ability to align the desired barcode with the scan pattern without a likelihood that an undesired barcode will be inadvertently aligned with the scan pattern before the desired barcode is successfully aligned.

In order to be certain that the barcode is aligned properly with the scan pattern, the operator needs to see the scan pattern. Holding the pushbutton 116 is in the first pressed position prevents a barcode on which the scan pattern falls from being processed immediately. In this way, the scanner 100 is allowed to produce a single line scan pattern which can be brought into alignment with a desired barcode, but which will not be processed to extract and register barcode information, even if the scan pattern falls on a barcode for which processing is not desired while being aligned with the desired barcode.

Once the barcode is aligned with the scan pattern, the operator moves the pushbutton 116 to a third position, which may also be referred to as a second pressed position. Upon detecting that the pushbutton 116 is in the second pressed position, the processor 114 continues to direct the scanner engine to produce a single line scan pattern, and also directs the decoding circuit 112 to decode any detected barcode. Upon receiving barcode information, the processor 114 registers and enters the barcode information.

If desired, a user may scan additional barcodes while the pushbutton 116 is in the second pressed position, provided that the barcodes are significantly separated from other barcodes. Use of the single line scan insures that only the barcode aligned with the single line scan pattern will be processed, and the separation from other barcodes gives the operator the ability to align the desired barcode with the scan pattern without a likelihood that a barcode for which decoding is not desired will be inadvertently aligned with the scan pattern before the desired barcode is successfully aligned.

Release of the pushbutton 116 allows the processor 114 to direct the scanner engine 102 to produce an omnidirectional scan pattern. Typically, however, if the pushbutton 116 has been set to the second pressed position, it can be presumed that a barcode, possibly in close proximity to other barcodes, has been placed within the field of view of the scanner 100. If the scanner engine 102 resumes producing an omnidirectional scan pattern while a barcode or barcodes are still within the field of view of the scanner 100, the scan pattern may fall on one or more barcodes, causing processing of a barcode which is not desired to be read at a given point in time. Therefore, the processor 114 delays directing an omnidirectional scan pattern for a predetermined delay period when the pushbutton 116 is moved to the released position after having been in the second pressed position. This allows the barcode which has been scanned, along with other barcodes in proximity to it, to be removed from the field of view of the scanner 100 before an omnidirectional scan pattern is resumed.

Figure 2:
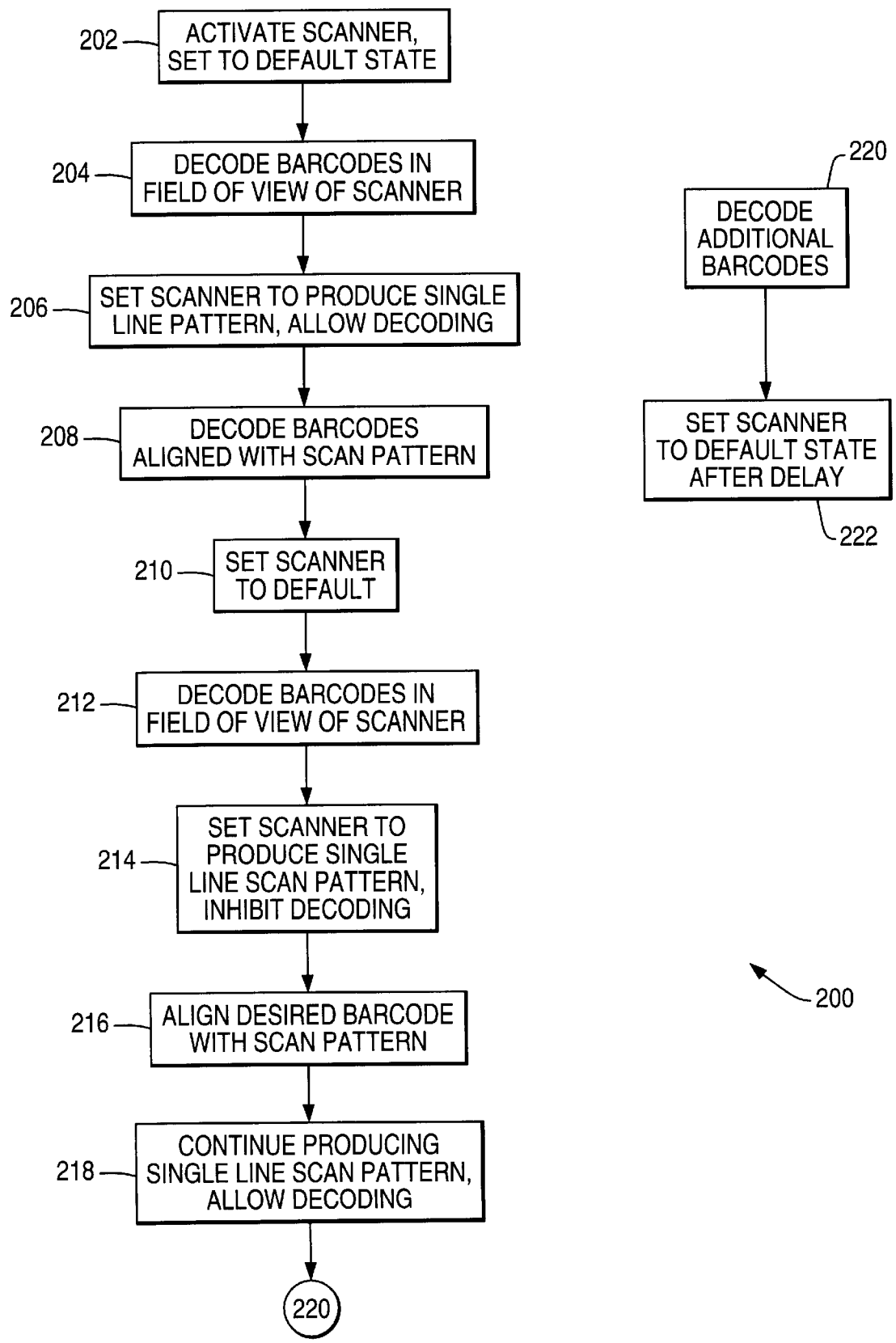
FIG. 2 illustrates a process of barcode scanning and processing according to the present invention.

FIG. 2 illustrates a process of barcode scanning 200 according to the present invention. At step 202, a scanner is activated and set to a default state, preferably of producing an omnidirectional scan pattern and immediately recognizing and registering any barcode entering the field of view of the scanner. At step 204, barcodes falling within the field of view of the scanner are decoded and registered. At step 206, in response to an operator selection, the scanner is set to produce a single line scan pattern and to immediately recognize and register any barcodes aligned with the scan pattern. At step 208, barcodes aligned with the scan pattern are decoded and registered. At step 210, in response to a further operator selection, the scanner begins a predetermined delay period and then, after the completion of the delay, is returned to the default state of producing an omnidirectional scan pattern and immediately registering barcodes. At step 212, barcodes falling within the field of view of the scanner are decoded and registered. At step 214, in response to a further operator selection, the scanner is set to produce a single line scan pattern but to refrain from processing and registering barcodes on which the scan pattern falls. At step 216, a desired barcode is brought into alignment with the scan pattern. At step 218, in response to a further operator selection, the scanner is set to continue producing a single line scan pattern and to decode and register barcodes on which the scan pattern falls. When this selection is made, the barcode which has been brought into alignment with the scan pattern is decoded and registered. At step 220, other barcodes brought into alignment with the scan pattern are decoded and registered. At step 222, in response to a further operator selection, the scanner begins a predetermined delay period and then, after the completion of the delay, resumes the default state, again preferably producing an omnidirectional scan and immediately decoding and registering barcodes detected within the field of view of the scanner. The steps of the process 200 have been presented here in an order chosen to show the different sequences of states into which the scanner can be set. It will be recognized, however, that the steps need not be executed in the order presented here, but can be chosen according to the different barcodes to be scanned and the particular operator selection made.

While the present invention is disclosed in the context of a presently preferred embodiment, it will be recognized that a wide variety of implementations may be employed by persons of ordinary skill in the art consistent with the above discussion and the claims which follow below. By way of example, while an exemplary embodiment is illustrated here employing a pushbutton as a selection device, it will be readily apparent that any of a number of alternative selection devices may be used, including slide switches, dials, knobs, voice recognition systems, or any desired device which allows a user to communicate a selection to the scanner.

We claim:

1. A barcode scanner, comprising:
    a scanner engine to produce a barcode scan pattern and receive reflected light produced when the scan pattern falls on a barcode, the scanner engine producing a barcode signal in response to the reflected light;
    a decoding circuit for decoding the barcode signal to extract barcode information;
    a user selection device for receiving a user input and producing user selection information for use in selecting a desired operational state of the scanner; and
    a processor receiving operator selection information from the user selection device and barcode information from the decoding circuit, the processor controlling the scanner engine to select a scan pattern to be produced by the scanner engine in response to the operator selection information, the processor being operative to receive and register barcode information from the decoding circuit, the processor being operative to control decoding of the barcode by the decoding circuit, the processor being operative to prevent or allow decoding of the barcode in response to user selection information such that if a user selection is made to prevent decoding of the barcode, the decoding circuit can receive a barcode signal produced by reflections of the selected scan pattern from a barcode without decoding the barcode signal.

2. The scanner of claim 1 wherein the user selection device is a switch.

3. The scanner of claim 2 wherein the switch is a three position switch having a first, a second and a third position.

4. The scanner of claim 3 wherein the processor directs the scanner engine to produce an omnidirectional scan pattern when the switch is in the first position.

5. The scanner of claim 4 wherein the processor directs the scanner engine to produce a single line scan pattern when the switch is in the second or the third position.

6. The scanner of claim 5 wherein the processor prevents decoding of the barcode when the switch is in the second position and allows decoding of the barcode when the switch is in the third position.

7. The scanner of claim 6 wherein the processor delays directing the scanner engine to produce an omnidirectional scan pattern if the switch is placed in the first position after having previously been in the third position.

8. The scanner of claim 7 wherein the switch is a pushbutton and wherein the first position is a released position, the second position is a first pressed position and the third position is a second pressed position.

9. The scanner of claim 8 wherein the scanner is an omnidirectional presentation scanner.

10. A method of barcode scanning, comprising the steps of:
    setting a scanner to produce a selected scan pattern and to inhibit decoding and registering of barcodes aligned with the scan pattern even when the selected scan pattern is being produced and is being reflected from a barcode into the scanner;
    bringing a barcode into alignment with the scan pattern; and
    setting the scanner to decode and register the barcode.

11. The method of claim 10 wherein the scan pattern is a single line scan pattern.

12. The method of claim 11 wherein the step of setting the scanner to produce the single line scan pattern and to inhibit decoding and registering barcodes aligned with the scan pattern is preceded by a step of setting the scanner to produce an omnidirectional scan pattern and to allow decoding and registering of barcodes falling within the omnidirectional scan pattern, and a further step of decoding and registering barcodes.

13. The method of claim 12 wherein the steps of bringing a barcode into alignment with the scan pattern and setting the scanner to decode and register the barcode are followed by successive steps of setting the scanner to inhibit decoding and registering of barcodes, bringing a barcode into alignment with the scan pattern, and setting the scanner to allow decoding and registering of the barcode.

14. The method of claim 13 wherein the step of setting the scanner to allow decoding and registering of the barcode is followed by a step of setting the scanner to produce an omnidirectional scan pattern after a predetermined delay.

* * * * *